United States Patent [19]

Leben

[11] Patent Number: 5,341,926
[45] Date of Patent: Aug. 30, 1994

[54] CONTAINER FOR CARRYING AND TRANSPORTING COMPUTER TAPE CARTRIDGES

[76] Inventor: David G. Leben, 6115 E. 8th St., Wichita, Kans. 77218

[21] Appl. No.: 113,174

[22] Filed: Aug. 30, 1993

[51] Int. Cl.⁵ .................. B65D 43/22; B65D 85/575
[52] U.S. Cl. ........................... 206/307; 206/509; 206/387; 220/324; 220/469
[58] Field of Search ............ 206/307, 309, 303, 387, 206/444, 509, 511; 220/334, 337, 338, 469, 324

[56] References Cited

U.S. PATENT DOCUMENTS

| | | | |
|---|---|---|---|
| 3,710,900 | 1/1973 | Fink | 220/410 |
| 3,730,576 | 1/1973 | Schurman | 220/334 |
| 4,153,178 | 5/1979 | Weavers | 206/387 |
| 4,615,464 | 10/1986 | Byrns | 220/469 |
| 4,703,853 | 11/1987 | Byrns | 206/387 |
| 4,796,755 | 1/1989 | Ardenti | 206/387 |
| 4,874,088 | 10/1989 | Leben | 220/469 |
| 5,006,038 | 4/1991 | Leben | 206/511 |
| 5,009,312 | 4/1991 | Leben | 220/469 |

FOREIGN PATENT DOCUMENTS 2091692 8/1982 United Kingdom ............ 206/387

*Primary Examiner*—Jimmy G. Foster
*Attorney, Agent, or Firm*—John Wade Carpenter

[57] ABSTRACT

A container for carrying and transporting computer tape cartridges comprising a container top pivotally secured to a container base. Both the top and the base are provided with hollow walls and ends. Both the base and the top are further provided with ribs and ridges which hold computer tape cartridges stationary while the container is being carried and/or transported. A caddy is removably disposed in said container.

5 Claims, 8 Drawing Sheets

CONTAINER FOR CARRYING AND TRANSPORTING COMPUTER TAPE CARTRIDGES

BACKGROUND OF THE INVENTION

1. Field of the Invention

This invention is related to a container. More specifically, this invention provides for an improved container comprising an double walled container, for carrying and transporting computer tape cartridges, particularly 8 mm and 4 mm and 0.25 inch and 0.50 inch data cartridges, and the like, in a protected fashion.

2. Description of the Prior Art

A patentability investigation was conducted and the following U.S. patents were discovered: U.S. Pat. No. 3,902,628 to Schurman; U.S. Pat. No. 3,730,576 to Schurman; and U.S. Pat. Nos. 5,006,038, 4,874,088, and 5,009,312 all to David G. Leben. The foregoing U.S. Patents are fully incorporated herein as if repeated verbatim hereafter. None of the foregoing prior art patents teach or suggest the particular combination of this invention.

SUMMARY OF THE INVENTION

The present invention accomplishes its desired objects by broadly providing a container for carrying and transporting computer tape cartridges and the like, especially 8 mm and 4 mm data cartridges. The computer tape cartridge container includes a container base having a base bottom, a pair of hollow upright side walls integrally secured to the base bottom, and a pair of base end walls integrally secured to the base bottom and to the base side walls. Each of the base hollow upright side walls has a base outside wall and a base inside wall with the base outside wall having a structure defining a plurality of hollow flat dome-shaped protrusions spaced by an abridging outside wall member. The base inside wall has a structure defining at least one generally flat rib or protrusion formed from the inside wall member. The base bottom has a base outside wall, and a base inside wall with a structure having a plurality of dome-shaped recesses. The container further comprises a container lid pivotally secured to the container base. The container lid has a structure with a trough for removably receiving a perimetrical ridge secured to the container base. A caddy is provided for adaptably fitting computer tapes that do not conform to the internal dimensions of the container such that the smaller computer tapes are generally held tightly in the container.

It is therefore an object of the present invention to provide a container for carrying and transporting computer tape cartridges.

These, together with the various ancillary objects and features which will become apparent to those skilled in the art as the following description proceeds, are attained by this novel container, a preferred embodiment as shown with reference to the accompanying drawings, by way of example only, wherein;

DETAILED DESCRIPTION OF THE INVENTION

Figure 1:
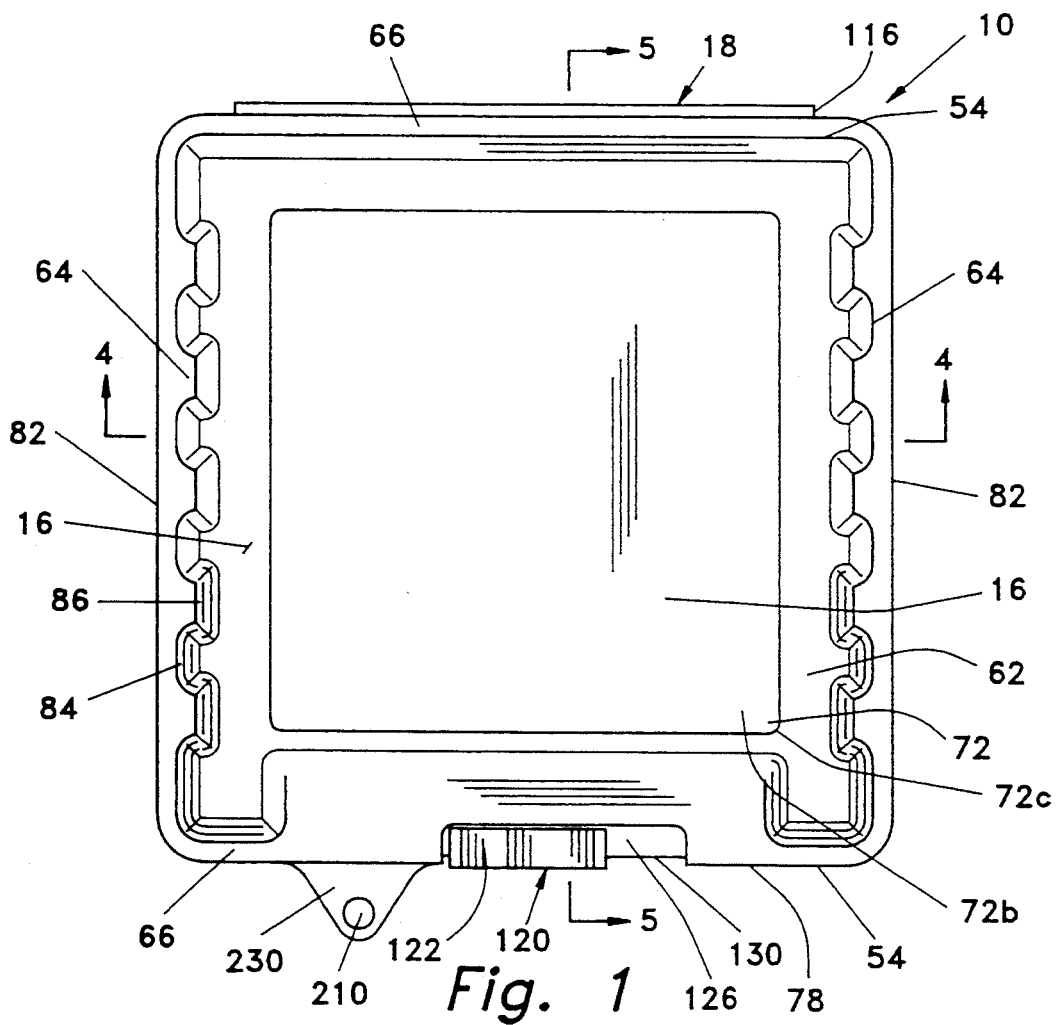
FIG. 1 is a top plan view of the container of the invention.

Referring in detail now to the drawings wherein similar parts of the invention are identified by like reference numerals, there is seen a container, generally illustrated as 10, for carrying and transporting computer tape cartridges 12 and the like. The container 10 has a container base 14 (see FIG. 3) pivotally secured to a container top 16 (see FIG. 17) along a hinge structure, generally illustrated as 18.

Figure 3:
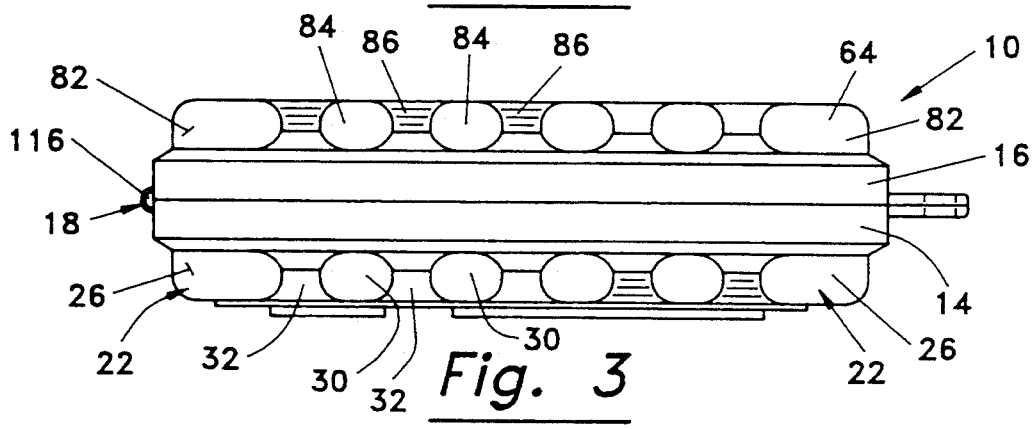
FIG. 3 is a side elevational view of the container of FIGS. 1 and 2.
Figure 4:
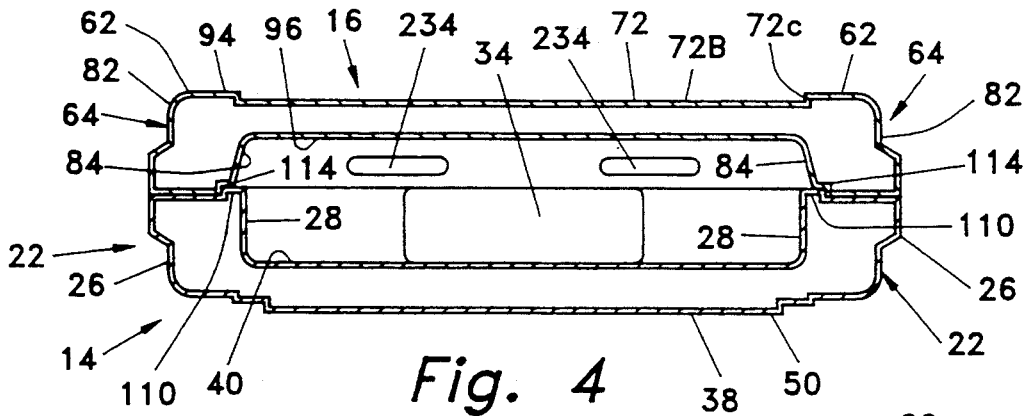
FIG. 4 is a vertical sectional view taken in direction of the arrows and along the plane of line 4—4 in FIG. 1.
Figure 5:
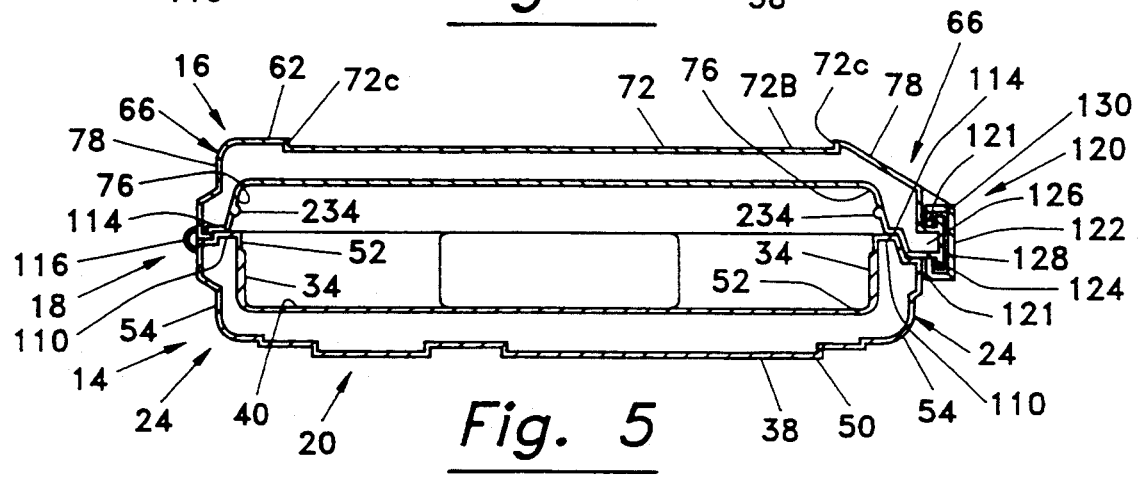
FIG. 5 is a vertical sectional view taken in direction of the arrows and along the plane of line 5—5 in FIG. 1.
Figure 6:
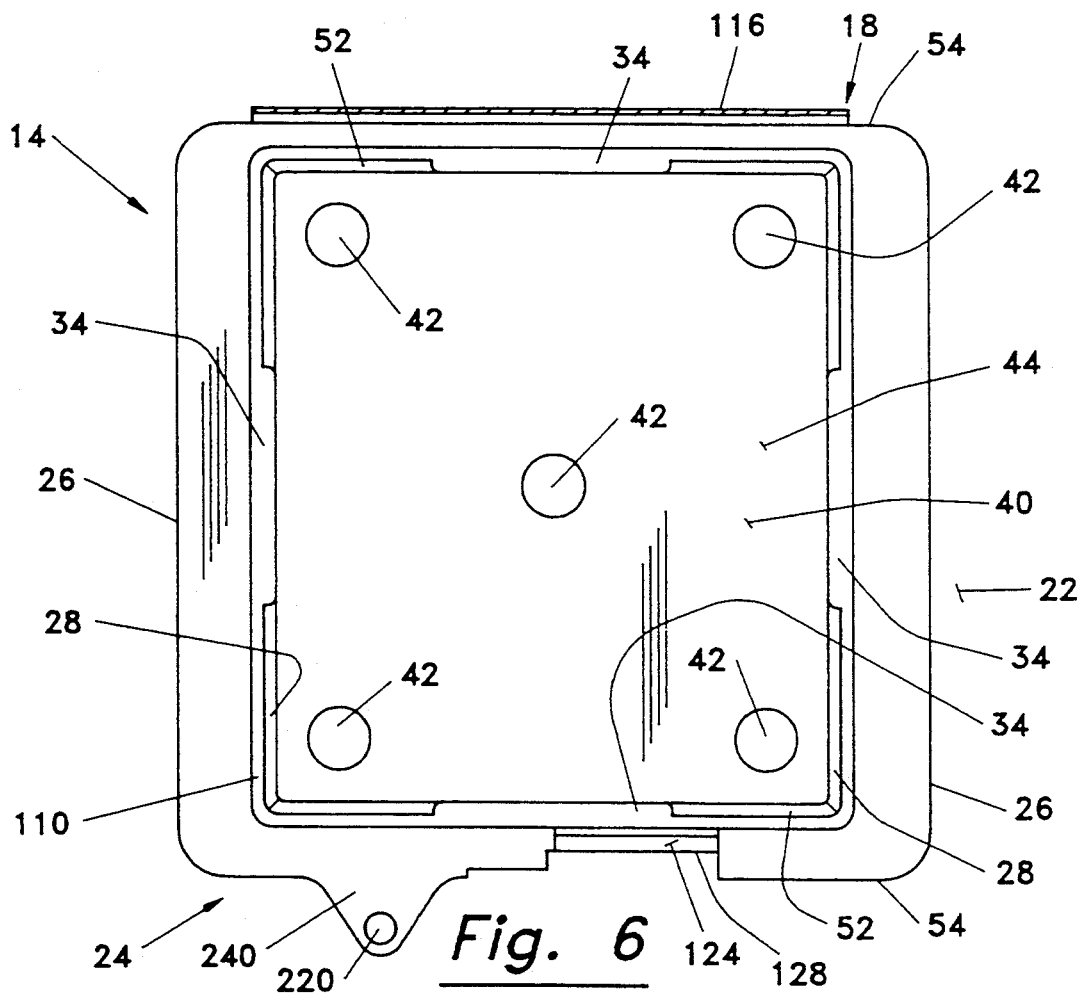
FIG. 6 is a horizontal sectional view taken in direction of the arrows and along the plane of line 6—6 in FIG. 2.
Figure 7:
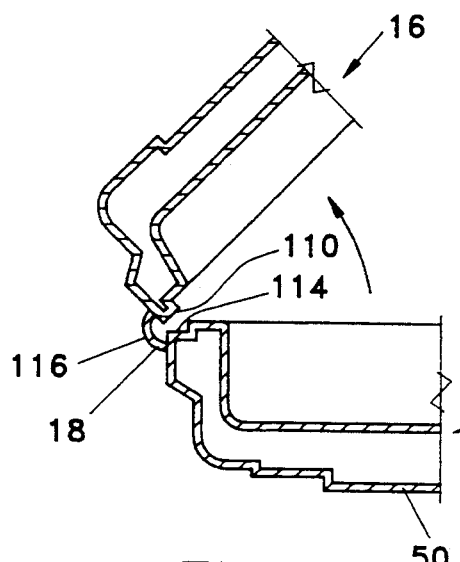
FIG. 7 is partial sectional view of the view depicted in FIG. 5 having a top of the container open.
Figure 14:
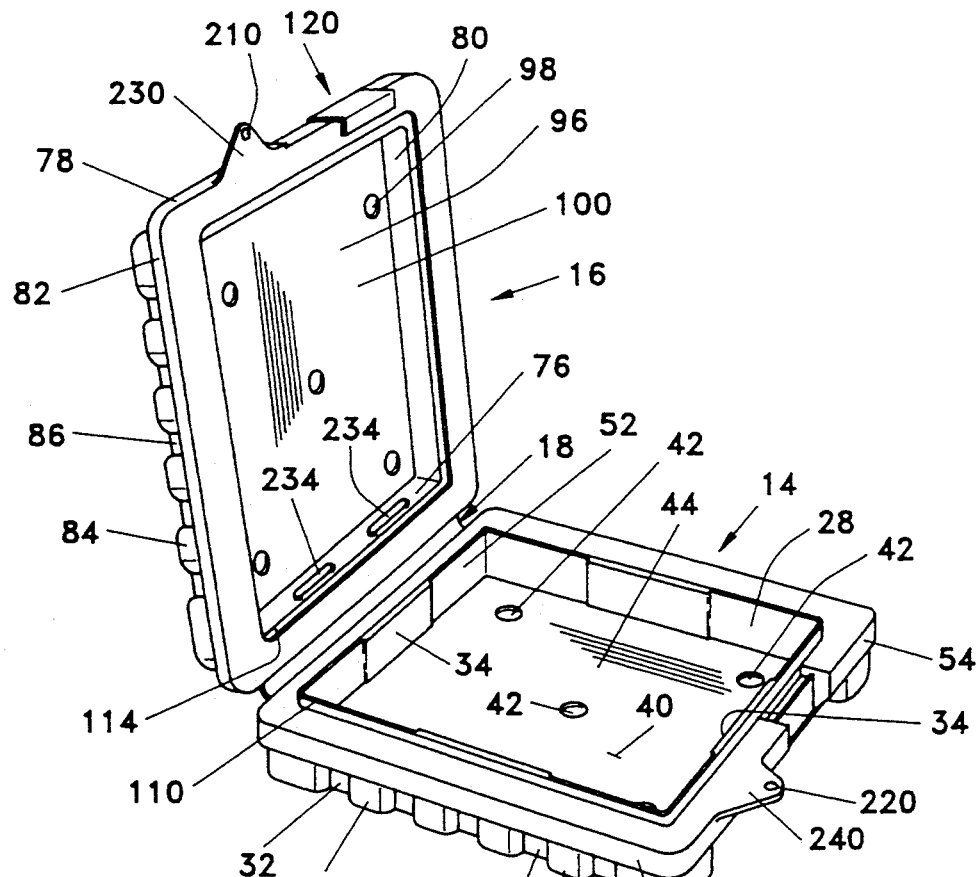
FIG. 14 is a perspective view of the container having the top thereof in an open position.

As best shown in FIG. 5, the container base 14 has a bottom 20, a pair of hollow upright side walls 22—22 supported by the bottom 20, and a pair of hollow end walls 24—24 (see FIG. 4) supported by the bottom 20 and connecting to the side walls 22—22 (see FIG. 4). Each of the end walls 24—24 (refer to FIG. 5) is made up of or formed with an outside wall 54 and an inside wall 52 thereof. Similarly, each of the side walls 22—22 is made up of or comprises or is formed with an outside wall 26 and an inside wall 28 (see FIG. 4). The outside wall 26 as best shown in FIG. 3 is formed with a plurality of hollow dome-shaped protrusions 30 spaced by an abridging wall member 32. As further best shown in FIG. 14, the inside wall 28 is formed to have at least one flat rib or protrusion 34. The bottom 20 of the container base 14 has an outside wall 38 and an inside wall 40 (see FIGS. 4 and 5). The flat rib or protrusion 34 is formed from the inside wall 28 and is formed such that is abridges or is formed into the inside wall 40 of the container base 14. Correspondingly, the inside wall 52 of end wall 24 comprises the flat rib or protrusion 34 such that it is formed from the inside wall 52 and abridges the inside wall 40 of the base 14. The inside wall 40 of the container base is formed with a plurality of dome shaped ridges 42 separated by a base floor 44 (see FIG. 14). In one preferred embodiment there are about 5 of the dome shaped ridges. Integrally bound to or formed from the outside wall 38 of the bottom 20 is a protruding leg or foot 50. Foot 50 has a given length (as measured from the outside wall 38 of the container base 14), typically 1/16 inch to ½ inch.

Figure 19:
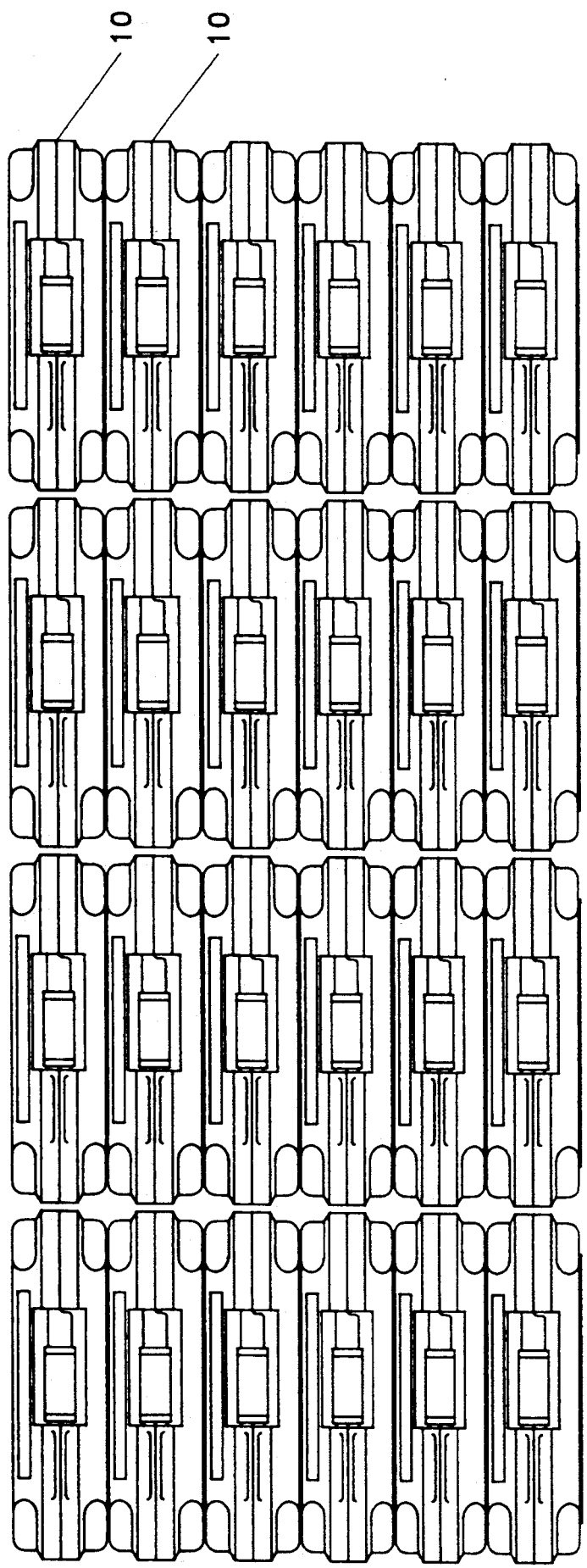
FIG. 19 is a perspective view of a plurality of the containers in a vertically stacked posture.

The container top 16 has a top 62, a pair of top hollow side walls 64—64 (see FIG. 4) supported by the top 62, and a pair of hollow end walls 66—66 (see FIG. 5) supported by the top 62 and second to the side walls 64—64. A top recess 72 having a top recess bottom 72B and recess corners 72C (see FIG. 5) is formed from top 62. Recess 72 has a depth that is slightly longer, deeper or greater than protruding foot 50 and is generally slightly larger than protruding foot 50 in length and width such that the protruding foot 50 of another container 10 may be frictionally or slidably be received thereby. Such an arrangement allows a plurality of the containers 10 to be stacked without readily collapsing due to lateral slippage thereof (see FIG. 19).

Each of the hollow end walls 66—66 has a top inside wall 76 (see FIG. 5) and a top outside wall 78 (see FIG. 5). Each of the hollow side walls 64—64 is made up or formed with a top outside wall 82 and a top inside wall 84. The top outside wall 82 as best shown in FIG. 3 is formed with a plurality of hollow flat dome-shaped protrusions 84 spaced or separated by abridging wall member 86. The protrusions 84 are hollow arcuate protrusions or the like that enable the container to absorb G-forces and impact forces when the container 10 is dropped or otherwise comes in abrupt contact with a solid object. The abridging wall member 86 provides extra, synergistic strength to or for the outside serrated shaped or formed wall 82. Similarly, the protrusions 30 are also hollow arcuate protrusions or the like that enable the container to absorb G-forces and impact forces when the container 10 is dropped or otherwise comes in abrupt contact with a solid object. The abridging wall member 32 provides extra, synergistic strength to or for the outside serrated shaped or formed wall 26.

Figure 15:
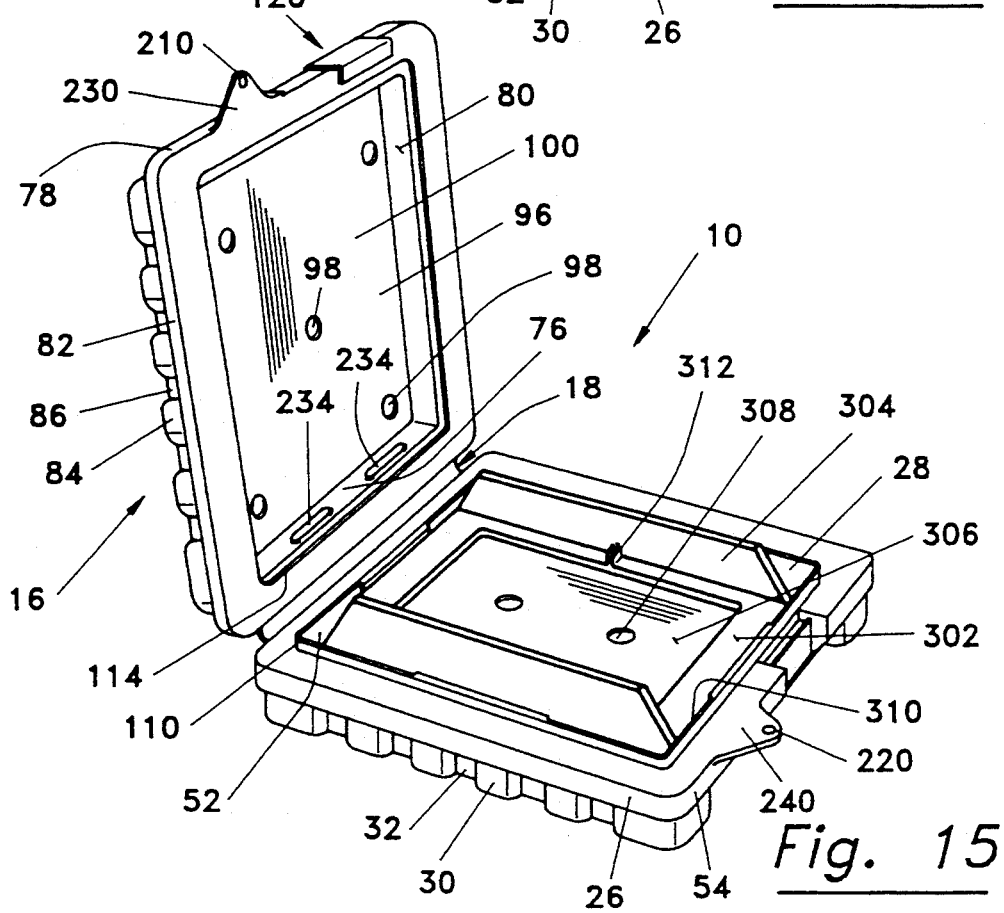
FIG. 15 is a perspective view of the container of FIG. 14 additionally having the caddy of FIG. 10 disposed therein.

The top 62 has a top outside wall 94 and a top inside wall 96 (see FIG. 4). The top inside wall 96 is formed with a plurality (i.e. four (4)) of hollow flat dome-shaped ridges (or protrusions) 234 separated by a top floor 100 (see FIGS. 14 and 15). When a computer tape cartridge 12 is disposed or lodged between the two (2) pair of contiguous ridges 34 and on the base floor 44 (see FIG. 14), and the container top is pivotally closed, the top of the computer tape cartridge 12 lodges between the two (2) pair of dome-shaped ridges 234 on the top floor 100 on the inside of the container top 16. Thus, ridges 34 and base floor 44 or ribs 34—34 on the inside of the container base 14 are respectively aligned with the ridges 234 and top floor 100 on the inside of the container top 16, all for the purpose of holding the computer tape cartridges 12 fixed or stationary while being carried and transported in container 10.

Figure 9:
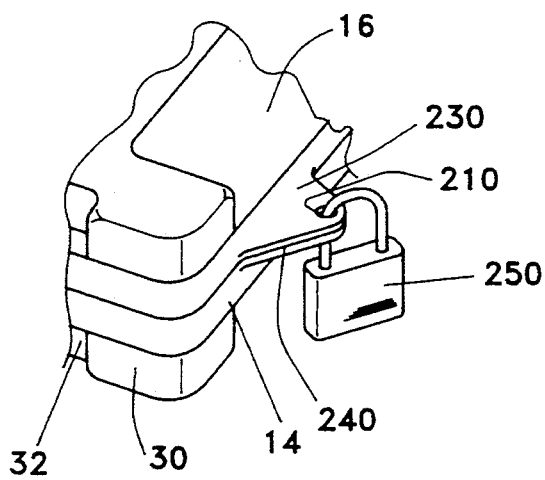
FIG. 9 is a partial perspective view of the container disclosing a pair of leg members having eyelets thereof for receiving a padlock member.
Figure 10:
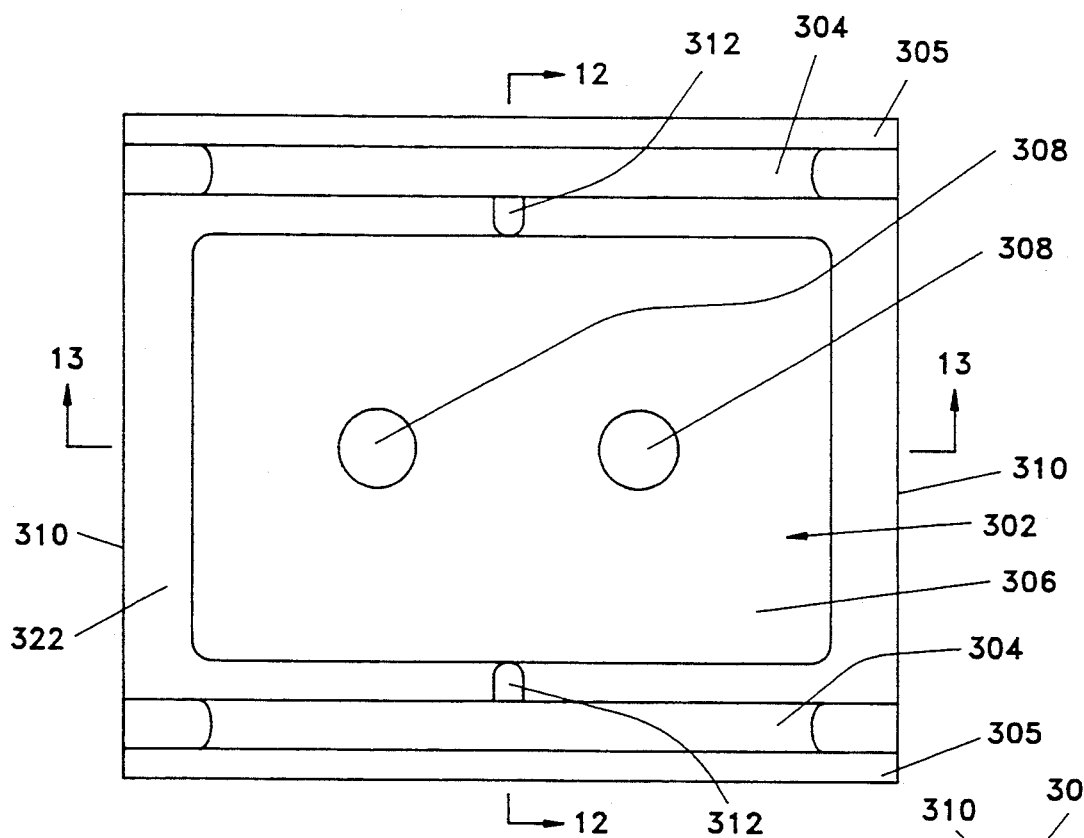
FIG. 10 is a top plan view of a removable caddy separated from the container.
Figure 11:
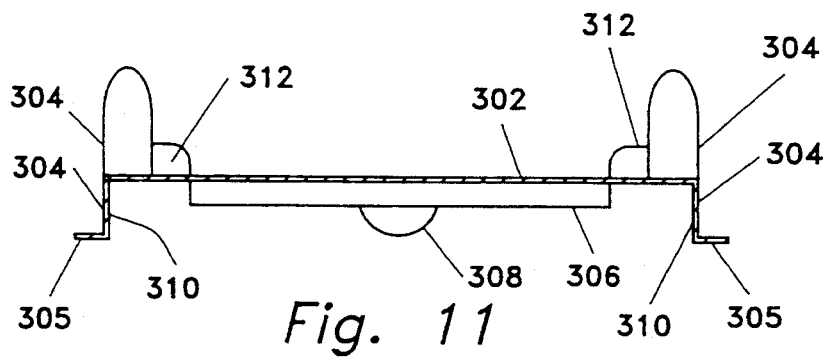
FIG. 11 is a sectional view of the caddy of FIG. 10.
Figure 12:
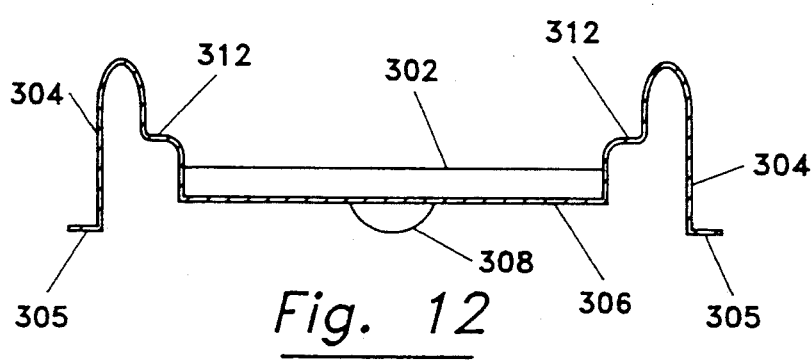
FIG. 12 is a vertical sectional view taken in direction of the arrows and along the plane of line 12—12 in FIG. 10.

When container top 16 is pivotally shut or closed against the container base 14, a tight fit is developed. Such a tight fit results from a perimetrical base ridge 110 (see FIGS. 4 and 5), which traverses the top of the side walls 22—22 and the top of the end walls 24—24, removably lodging into a perimetrical recess 114 (see FIG. 17) which traverses the bottom of the top side walls 64—64 and the bottom of the end walls 66—66. The embodiment shown by FIGS. 4 and 5 discloses an interconnecting hinge member 116 secured to both the container base 14 and the container top 16. In this embodiment, hinge member 116 is formed from the outside wall 66 of container top 16 and outside wall 24 of the container base 14 such that the hinge member 116 is flexible. In this embodiment, hinge member 116 comprises a material, such as plastic, that is inherently flexible. It should be understood that the container 10 of this invention may be formed with hinges 140 that are best described in U.S. Pat. No. 3,730,576, fully incorporated herein by reference thereto. Hinges 140 may also take the form of hinges described in U.S. Pat. No. 3,902,628 which is also fully incorporated herein by reference thereto. A lock 250 (see FIG. 9) may be provided with container 10 for passing through eyelets 210 and 220 to lock shut the container 10.

Figure 2:
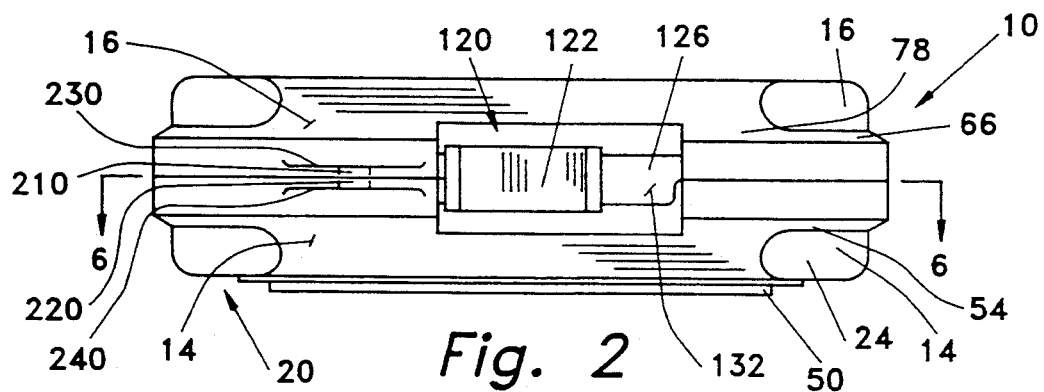
FIG. 2 is a front elevational view of the container of FIG. 1.
Figure 8:
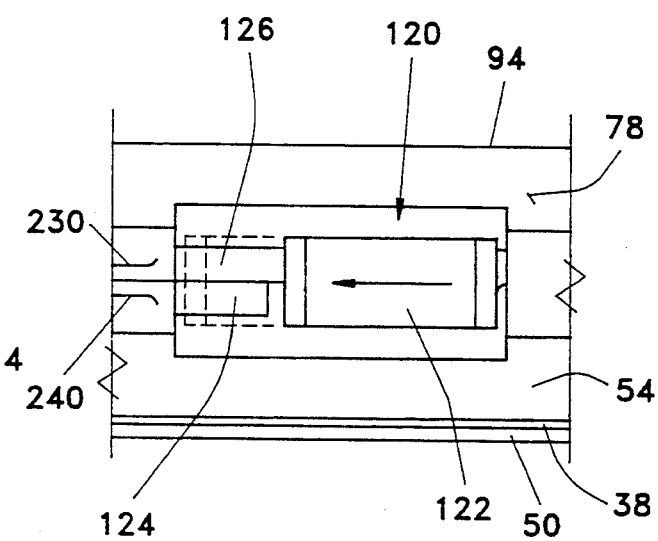
FIG. 8 is a partial front elevational view of the container disclosing a closure assembly.

The container 10 comprises a closure assembly 120 for releasably locking the container 10 in a closed position. As best shown in FIG. 8, the closure assembly 120 comprises a latch member 122 frictionally and slidably disposed on a pair of closure ends 124-126 formed out of or secured to the container base 14 and the container top 16, respectively. Latch member 120 comprises a structure that is generally C-shaped in cross section, such that opposed ends 121—121 thereof (see FIG. 5) are hooked on a pair of opposed lip members 128-130 of the base and top closure ends 124-126, respectively. When the closure assembly 120 is in the unlatched position, the latch member 122 rests on a flared end 132 (see FIGS. 2 and 8) of closure end 126, such that closure end 124 is free to separate from closure end 124. When the closure assembly is to be latched, the latch member 122 is frictionally slipped over the closure ends 126 and 124. Latch member 122 does not slide off of the closure ends 124-126 due to the opposed lip members 121—121 that hook the latch member 122 around the closure ends 124-126 (see FIG. 5).

The container 10 of this invention, including all of its parts, may be manufactured from any suitable thermoplastic material, such as high density polyethylene, polypropylene, polyvinyl, and elastomeric polyolefin, which are given by way of example only. Preferably, the container 10 of this invention is made from a high density polyethylene to allow maximum "shock" protection if the container 10 is dropped. Air space is created in its double shell (i.e. dual walls and ends for both the container top 16 and the container base 14) construction to cushion cartridges 12 from damaging blows. The hinge structure 18 is formed such that the container top 16 and the container base 14 can be opened into a 180 degree position to provide stability in such opening position. The container base 14 and the container top 16 are approximately the same height such that the 180 degree opened posture is indeed stable.

The container 10 of this invention is very stackable. The rectangular shaped stacking feature of FIG. 15 prevents the containers 10—10 from sliding when placed one on top of another. As previously indicated, the protruding foot 50 on the bottom 20 of the container base 14 and the recess 72 in the container top 62 are formed such that the container base 14 of one container can be locked against the container top 16 of a lower container, providing excellent stackability in carrying and transporting containers 10.

Figure 13:
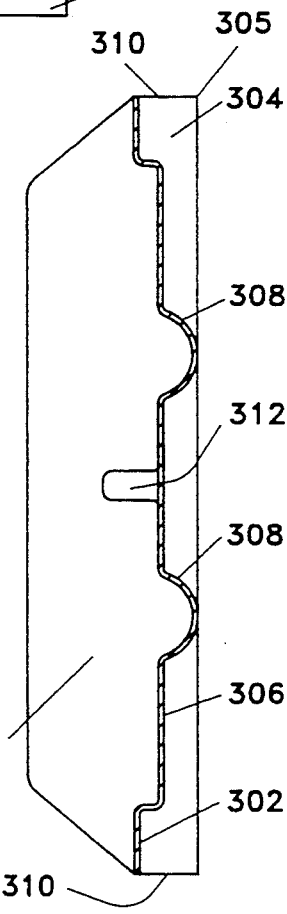
FIG. 13 is a vertical sectional view taken in direction of the arrows and along the plane of line 13—13 in FIG. 13.
Figure 16:
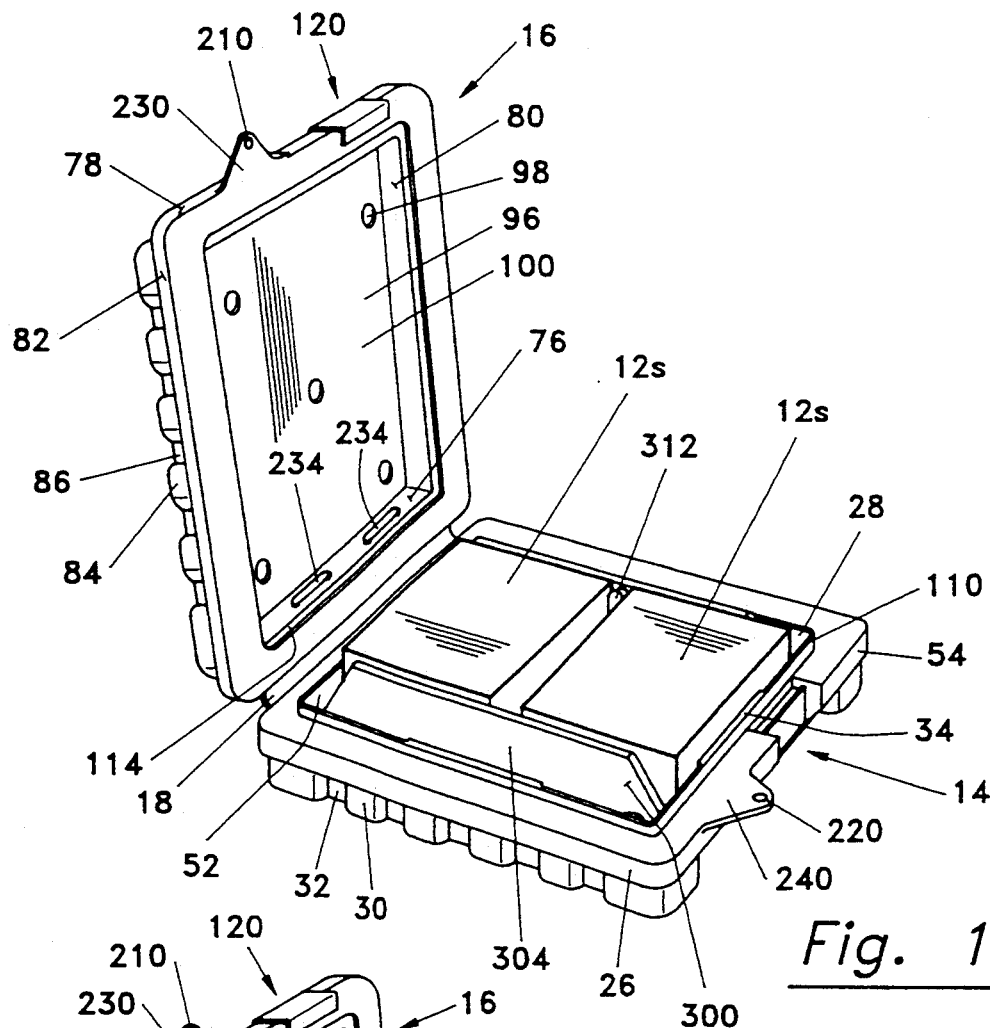
FIG. 16 is a perspective view of the container of FIG. 15 having a pair of small computer tape cartridges (i.e. 4 mm data cartridges) disposed in the caddy.
Figure 17:
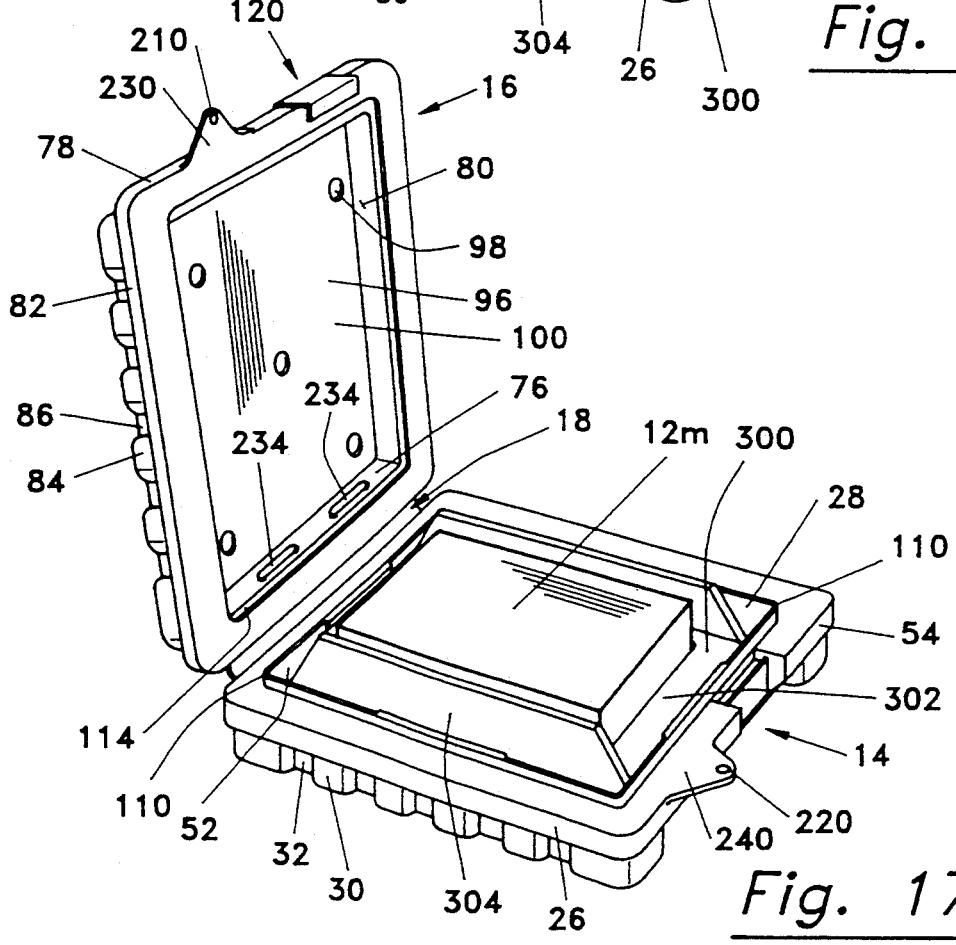
FIG. 17 is a perspective view of the container of FIG. 15 having a larger sized computer tape cartridge (i.e. 8 mm data cartridge) disposed in the caddy.
Figure 18:
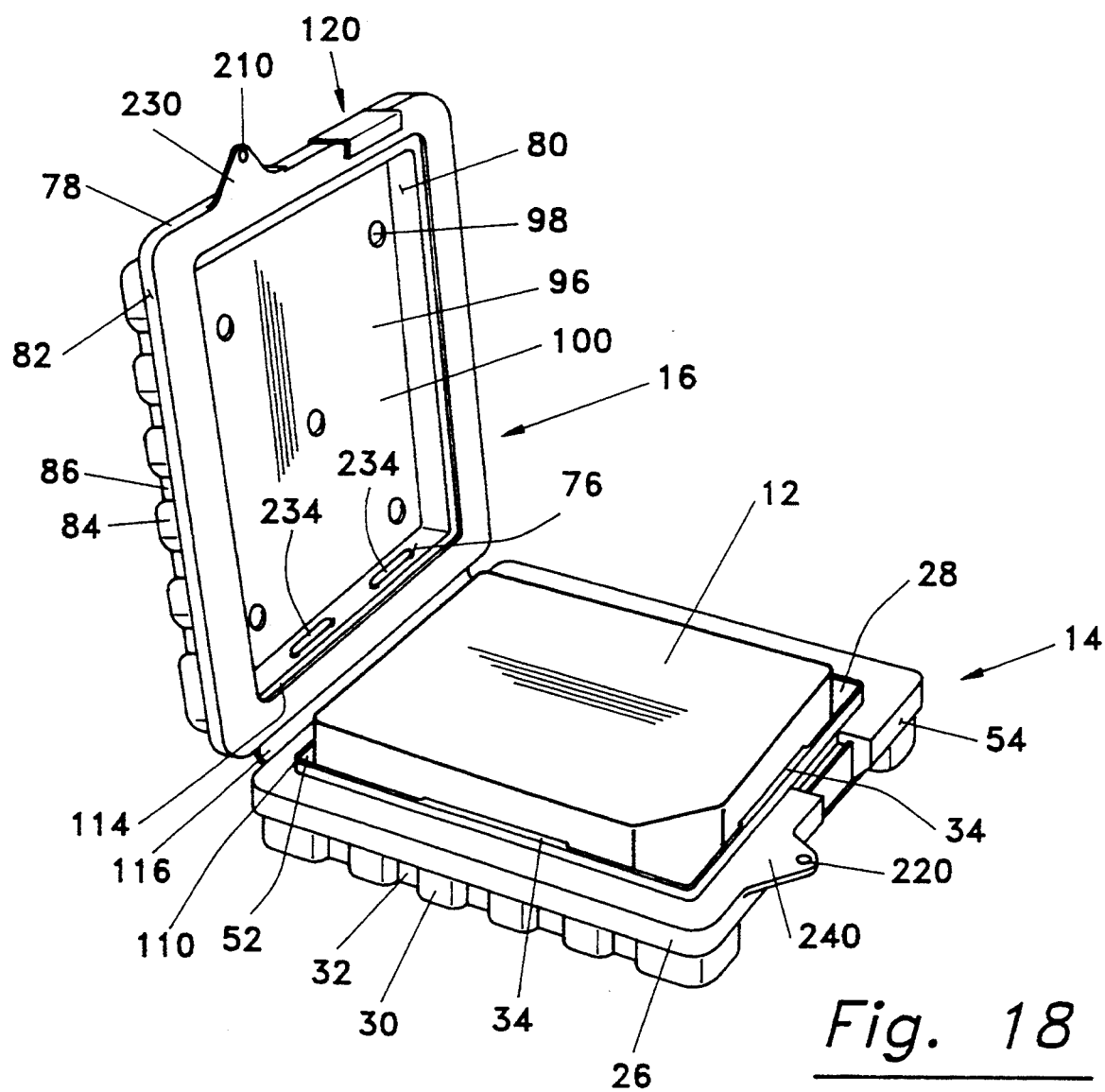
FIG. 18 is a perspective view of the container of FIG. 14 having a large sized computer tape (i.e. 3480 type tape) cartridge disposed therein.

In the case of transporting a tape cartridge 12 that is smaller than the inner dimensions of the container 10, such as a 4 mm tape cartridge, a caddy 300 (see FIGS. 10–13) is provided for engaging a cartridge 12 that is insufficient in size to be tightly encased by the container 10. In one preferred embodiment, the caddy 300 is designed to fit a pair of small tape cartridges 12s—12s, as shown in FIG. 16, or a single tape cartridge 12m that is larger than the small tape cartridges 12s—12s and smaller than the inner dimensions of container 10, as shown in FIG. 17. The caddy 300 comprises a floor 302 secured to a pair of hollow side walls 304—304. The hollow side walls 304—304 terminate in a foot member 305—305. A floor recess 306 is formed from floor 302 for receiving tape cartridge 12m. At least one dome-shaped recess 308 is formed from the floor recess 306 for engaging the inner wall 40 of the container. A pair of end walls 310—310 is secured to the side walls 304—304 (see FIG. 13) and the floor 302. The end walls 304—304 comprise a structure defining a rib member 312 secured thereto or formed therefrom for separating a pair of tape cartridges 12s—12s, as shown in FIG. 16. The caddy 300 is disposed on the inside wall 40 of the container base 14, and tape cartridges 12s—12s are disposed therein, such that they are separated by rib 312 and supported by floor 302 of the caddy. The container top 16 is closed and the dome-shaped ridges engage the tapes 12s—12s to hold same stationary. Alternatively, as shown in FIG. 17, the caddy is disposed in the container 10 and a tape cartridge 12m is disposed in recess 306 of the caddy. The container top 16 is closed and the top inside wall 96 engage the tape 12m to hold same stationary when the container 10 and the tape 12m therein are transported.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. An improved container for transporting computer tapes comprising a container base having a base bottom, a pair of base hollow upright side walls integrally secured to said base bottom, and a pair of base end walls integrally secured to said base bottom and to said base side walls, each of said base hollow upright side walls having a base outside wall and a base inside wall with said base outside wall having a structure defining a plurality of hollow dome-shaped protrusions spaced by an abridging outside wall member, and said base bottom having a base outside wall and a base inside wall having a structure defining a plurality of hollow flat dome-shaped ridges spaced by an abridging base inside wall member; and a container lid pivotally secured to said container base; at least one protruding foot member bound to said base outside wall; said container lid additionally has a structure defining a top recess; said container lid has a container top, a pair of top hollow side walls integrally secured to said container top, and a pair of top end walls integrally secured to said container top and to said top side walls, each of said top side walls having a top side outside wall and a top side inside wall with said top side outside wall having a structure defining a plurality of top hollow flat dome-shaped protrusions spaced by a top abridging side outside wall member, and said container top having a top outside wall and a top inside wall having a structure defining a plurality of top hollow flat dome-shaped ridges spaced by a top abridging inside wall member; and a caddy disposed in said container for engaging a small computer tape cartridge comprising a caddy base secured to a pair of caddy side walls, a pair of caddy end walls secured to said caddy base and said pair of caddy side walls, a floor recess formed out of said caddy base, and a dome shaped recess formed from said floor recess.

2. The container of claim 1 additionally comprising a caddy disposed in said container for engaging a small computer tape cartridge comprising a caddy base secured to a pair of caddy side walls, a pair of caddy end walls secured to said caddy base and said pair of caddy side walls, a floor recess formed out of said caddy base, and a dome shaped recess formed from said floor recess.

3. The container of claim 1 wherein said caddy additionally comprises a rib member formed from said caddy side walls and generally equispaced between said caddy end walls for separating a pair of small computer tapes.

4. An improved container for transporting computer tapes comprising a container base having a base bottom, a pair of base hollow upright side walls integrally secured to said base bottom, and a pair of base end walls integrally secured to said base bottom and to said base side walls, each of said base hollow upright side walls having a base outside wall and a base inside wall with said base outside wall having a structure defining a plurality of hollow dome-shaped protrusions spaced by an abridging outside wall member, and said base bottom having a base outside wall and a base inside wall having a structure defining a plurality of hollow flat dome-shaped ridges spaced by an abridging base inside wall member; and a container lid pivotally secured to said container base; a closure assembly formed from one of said base end walls and one of said top end walls, said closure assembly comprising a latch member having a pair of latch ends, said one base end wall having a base closure ledge formed therefrom and said one top end wall having a top closure ledge formed therefrom; said latch member is frictionally engaged to said base closure ledge and said top closure ledge, and wherein said top closure ledge comprises a flared section for slidably engaging said latch member; and additionally comprising a caddy disposed in said container for engaging a small computer tape cartridge comprising a caddy base secured to a pair of caddy side walls, a pair of caddy end walls secured to said caddy base and said pair of caddy side walls, a floor recess formed out of said caddy base, and a dome-shaped recess formed from said floor recess.

5. The container of claim 4 wherein said caddy additionally comprises a rib member formed from said caddy side walls and generally equispaced between said caddy end walls for separating a pair of small computer tapes.

* * * * *